Oct. 11, 1949.  B. A. BROWN ET AL  2,484,550
PROCESSING MACHINE
Filed Oct. 8, 1945
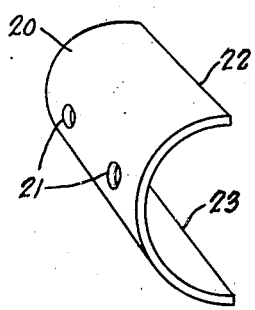
Fig. 1.
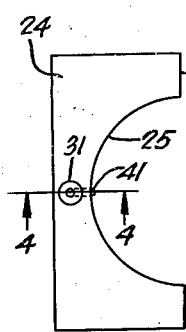
Fig. 2.
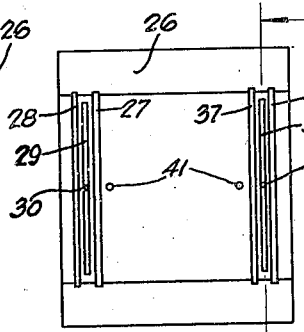
Fig. 3.
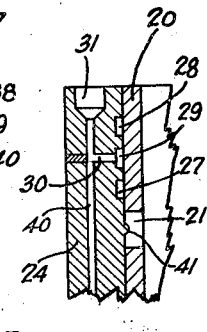
Fig. 4.
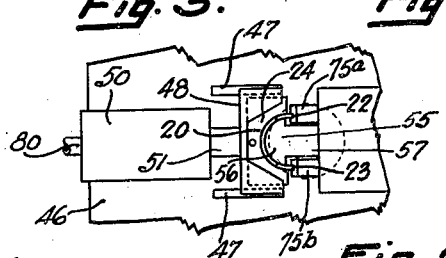
Fig. 6.
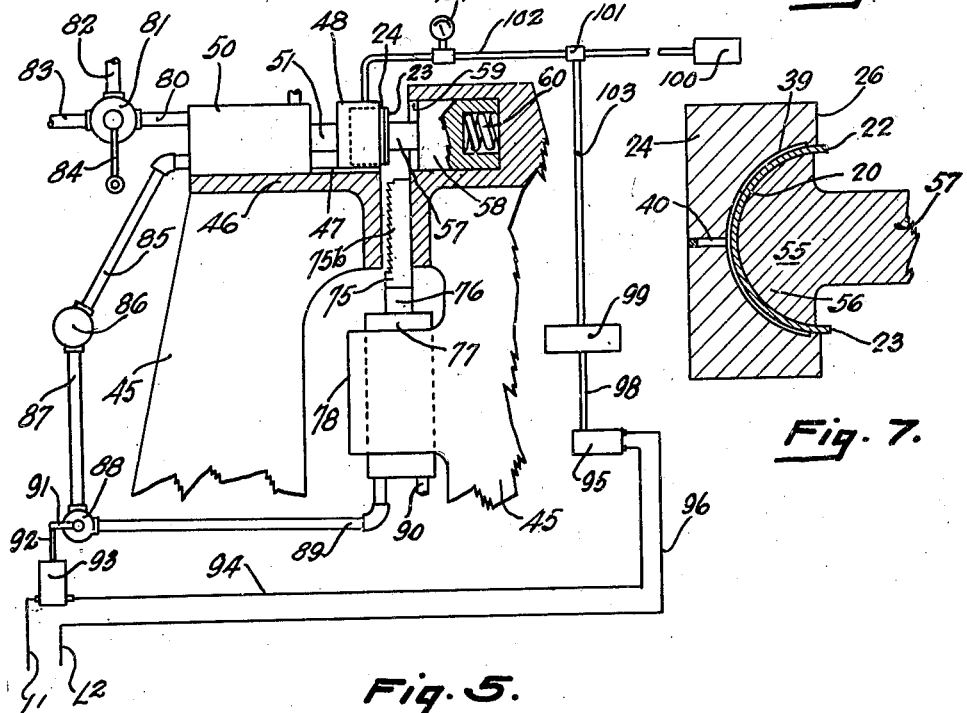
Fig. 5.
Fig. 7.
INVENTORS
BERNARD A. BROWN
HOOPER J. HOUCK
BY
Spencer, Hardman & Fehr
THEIR ATTORNEYS Patented Oct. 11, 1949

2,484,550

UNITED STATES PATENT OFFICE 2,484,550

PROCESSING MACHINE

Bernard A. Brown and Hooper J. Houck, Dayton, Ohio, assignors to General Motors Corporation, Detroit, Mich., a corporation of Delaware Application October 8, 1945, Serial No. 620,964

8 Claims. (Cl. 90—33)

This invention relates to improvements in machines for processing work pieces.

It is among the objects of the present invention to provide a work piece processing machine which not only substantially reduces spoilage or scrap but practically eliminates it independently of the operator.

A further object of the present invention is to provide a machine for processing work pieces which cannot be operated as long as the work piece is not properly secured in the machine relatively to the processing tool thereof.

A still further object of the present invention is to provide a machine for processing work pieces with a fixture for receiving and holding said work pieces in proper position relatively to the processing tool. If dirt, foreign particles or unfinished parts of the work piece prevent its proper fitting in the fixture, which would disturb its proper alignment with the processing tool, the machine cannot be started and a ruinous operation is thereby prevented.

Further objects and advantages of the present invention will be apparent from the following description, reference being had to the accompanying drawings, wherein a preferred embodiment of the present invention is clearly shown.

In the drawings:

Fig. 1 is a perspective view of a bearing, one type of work piece to be operated upon.

Fig. 2 is a plan view of the fixture in which the bearing is nested while being operated upon.

Fig. 3 is a front view into the fixture.

Fig. 4 is an enlarged, fragmentary section taken along the line 4—4 of Fig. 2 with the bearing added to show how the pressure duct in the fixture is closed by the bearing.

Fig. 5 is a diagrammatic view of a machine equipped with the present invention.

Fig. 6 is a fragmentary plan view of certain parts of Fig. 1.

Fig. 7 is a fragmentary sectional view taken along the line 7—7 of Fig. 3 with the bearing and clamping ram added.

For purposes of illustration and description, the invention is shown applied to a machine for trimming the two edge portions of a semi-cylindrical bearing element 20. It will, of course, be understood that the invention may be used on any type of machine adapted to operate in any manner upon any form of work piece held in proper position relatively to the operating tool.

The bearing 20 has two openings 21. When properly finished the two edges 22 and 23 must be in align and equidistant at all points from the vertex of the bearing. Before this present operation, that is, the trimming of the edges, the bearing was formed and shaped and the openings 21 provided therein. If a bearing is spoiled by the present operation, then valuable time and material expended to produce the bearing up to this point, will have been wasted. The present machine eliminates such wastage by assuring proper positioning of the work piece or bearing relatively to the operating tool before the machine may even be started.

Figs. 2 and 3 illustrate the fixture in which the bearing is nested when operated upon. Figs. 4 and 5 show this fixture secured in the machine and Fig. 7 shows the bearing 20 clamped in the fixture. As shown in Figs. 2 and 3, the fixture 24 is a rectangular block having a substantially semi-circular recess 25 provided in its one surface into which the bearing 20 snugly fits so that its two edges 22 and 23 extend beyond the surface 26 of the fixture as shown in Fig. 7. The semi-circular surface of recess 25 has two sets of slots or grooves 27, 28, 29 and 37, 38, 39, one set adjacent the top edge of the fixture, the other set near the bottom edge thereof. The center grooves 29 and 39 of each set, respectively, terminate short of the surface 26 of the fixture while the grooves 27—28 and 37—38, spaced on each side of the center grooves 29 and 39 respectively, terminate in the surface 26 of the fixture. Thus when the bearing is snugly nested in the fixture as shown in Fig. 7, the center grooves 29 and 39 are closed completely while the grooves 27—28 and 37—38 are open at the surface 26 of the fixture and communicate with atmosphere. A duct 30 leads from groove 29 into an enlarged recess 31 in the top side of the fixture which recess is adapted to receive an air pressure pipe as will later be described. A similar duct 40 connects groove 39 with said recess 31. The numeral 41 designates two small humps in the curved surface of recess 25, so spaced as to enter the openings 21 when the bearing is nested in the fixture.

The Figs. 5 and 6 diagrammatically show the machine as comprising a stationary base or frame 45, the platform 46 of which provides slide-ways 47 in which the fixture holder 48 is slidably secured. This holder is so constructed and arranged that the fixture 24, securely held therein, is readily accessible to the operator for insertion of the bearing 20 into the fixture.

A cylinder 50 is rigidly secured to the platform 46, said cylinder having a piston, not shown, to which is secured the piston rod 51 extending from the cylinder. The fixture holder 48 is fastened to the piston rod 51 so that hydraulic pressure, when introduced into the cylinder 50, urges the piston and its rod 51 outwardly to move the fixture carrier or holder 48 in the slide-way 47 toward the right as regards Figs. 5 and 6.

In order to clamp the work piece, the bearing 20 in this instance, rigidly in the fixture 24, a spring loaded abutment block 55 is provided, said block having a mushroom-shaped head 56 and a stem 57 which is secured to the main body portion 58. This body portion is non-rotatably but slidably carried in a recess 59 provided by the body of the machine frame 45. The body 58 is recessed to receive a spring 60 interposed between the body 58 and the inside wall of recess 59. The rounded end surface of the head 56 conforms with and fits the inner contour of bearing 20 so that when the fixture holder 48 is urged along the slide-way 47 by the hydraulically actuated piston and rod 51, the bearing 20 in the fixture 24 will be tightly clamped therein by the abutment block 55 as shown in Fig. 7. When the end of the body 58 engages the end wall of recess 59, the bearing 20, clamped between the mushroom-shaped head 56 of abutment block 55 and the fixture 24, is in the proper processing position relatively to the processing tool 75. The spring 60 is sufficiently heavy as to exert the force necessary to hold the abutment block against the bearing 20 and clamp it rigidly in the fixture.

The present drawings illustrate the processing tool 75 as a broach having two cutting portions 75a and 75b which operate upon the respective edges 22 and 23 of bearing 20 when the tool is actuated. Tool 75 is connected to the rod 76 which in turn is secured to a piston, not shown, slidable in the cylinder 77. This cylinder 77 is secured in the lug 78 on machine frame 45.

Both cylinders 50 and 77 have pistons and rods 51 and 76 respectively, which are moved by the introduction of fluid or hydraulic pressure into said cylinders. Cylinder 50 has a pipe 80 leading into it, said pipe being connected also with the manually operable valve 81 which has a pipe 82 connecting the valve with the source of fluid or hydraulic pressure, not shown, and an exhaust pipe 83. A lever 84 is shiftable into one position to connect the pipes 83 and 80 so that fluid pressure passes through the valve into cylinder 50 to actuate its piston and rod 51 toward the right as regards Figs. 5 and 6, or it may be shifted to another position to connect pipes 51 and 83 to permit the fluid pressure in the cylinder 50 to exhaust and permit the piston and rod 51 to be returned to normal position. When the lever 84 is in the position as illustrated the valve is closed.

A pipe 85 leads from cylinder 50 to a sequence valve 86 of any well known construction. Another pipe 87 leads from the sequence valve 86 to the normally closed valve 88 which is also connected with the cylinder 77 by a pipe 89. Valve 88 has an operating arm 91 to which the movable stem 92 of the electric solenoid actuator 93 is attached. A pipe 90 is connected to the hydraulic cylinder and, dependent upon the system used, may exhaust the pressure within cylinder 77 or introduce pressure into the cylinder 77, to return the processing tool to its normal position after it has completed its processing of the work piece.

One terminal of the solenoid 93 is connected to one power line L1, the other terminal having wire 94 connected thereto which wire leads to one terminal of the micro switch 95 which is normally in open circuit position. Wire 96 connects the other terminal of switch 95 with the other power line L2.

The microswitch 95, normally open, is closed by the actuation of the rod 98. A fluid pressure actuated device 99, of any suitable standard make, has the rod 98 connected thereto so that when a predetermined fluid pressure is applied to the device 99, it will actuate said rod to close the microswitch 95.

Any suitable source 100 of predetermined fluid pressure is connected with a coupling 101 from which two pipes 102 and 103 lead, one to a pressure gauge 104 and from said gauge to the recess 31 in the fixture 24, the other pipe 103, to the pressure actuated device 99.

The fragmentary, sectional view, Fig. 4, shows the bearing 20 fitting snugly against the inner, arcuate wall of the fixture 24. A perfectly fitting work piece or bearing 20 would completely shut off the central groove or duct 29 from the ducts 37 and 38 and therefore any fluid pressure introduced into the central duct 29 from the source of fluid pressure 100 through pipe 102 and duct 30 would be entirely confined in these passages inasmuch as no leak from duct 29 is present. Thus the entire predetermined fluid pressure delivered from source 100 is directed to the device 99 to operate it.

In commercial production all bearings or work pieces will not perfectly fit the fixture so as to preclude pressure leaks from the ducts 29 and 39. Imperfectly fitting work pieces and fixtures provide leaks from said ducts. Therefore certain tolerances are set which allows limited imperfections causing predetermined leakage of fluid pressure from ducts 29 and 39. Leakage from ducts 29 and 39, in excess of said predetermined amount, indicates conditions which result in the production of a non-usable work piece or bearing and therefore scrap. Assuming that a 25 pound fluid pressure is delivered from the source 100, any leakage from ducts 29 and 39 which would reduce the fluid pressure a predetermined amount, say for instance 4 pounds, would not interfere with the processing of the work piece. However, if the leakage exceeds this predetermined amount the reduction in fluid pressure, delivered to the fluid pressure actuated device 99, prevents its being actuated, for device 99 in this instance is set to be actuated at 21 pressure pounds or more but not less.

The machine functions in the following manner: Normally the fixture holder 48 is in a position in which it holds the fixture 24 spaced from the abutment block 55. Spring 60 normally maintains the body 58, to which block 55 is attached, so that the inner end of the body 58 is spaced from the inner end of the recess 59. The operator places a work piece, bearing 20 in this instance, in the fixture 24 so that it snugly nests therein. Then the operator actuates the valve lever 84 so that hydraulic or fluid pressure from the supply pipe 82 may be directed through valve 81 and pipe 80 into the cylinder 50 and against the piston therein. This pressure causes the piston and its rod 51 to move outwardly, toward the right as regards Figs. 5 and 6 thereby slidably moving the holder 48 in slide-way 47 so that the work piece 20 in the fixture 24 is brought into engagement with the head 56 of the abutment block 55. This movement of the holder 48 and its contained fixture and work piece continues, moving the abutment block 55 into the recess 59 against the effect of spring 60 until the end of the body 58, to which block 55 is attached, engages the inner wall of recess 59. This correctly locates the work piece relatively to the processing tool 75 and now the work piece is held clamped in the fixture 24. As soon as this phase of the operation is completed and the fluid pressure stabilizes, the sequence valve 86 becomes effective automatically to permit fluid or hydraulic pressure to be directed through pipe 85, valve 86 and pipe 87 to the now closed valve 88.

If holes 21 are provided in the bearing 20, the work piece, and if no dirt or foreign particles between the work piece and the fixture wall prevent its snug fit in said fixture so that no air pressure or an allowable limited air pressure leaks from air ducts 29 and 39, then the air pressure delivered from the source 100 and exerted upon the device 99, actuates said device to move rod 98 and close switch 95. By closing switch 95, the circuit through the solenoid actuator 93 is completed and it is energized to move stem 92 and valve lever 91 to open valve 88 and allow the fluid or hydraulic pressure to be directed through pipe 89 to cylinder 77. In response to this, the piston in cylinder 77 and its rod 76 are moved, actuating the processing tool 75 so that its portions 75a and 75b trim the edges 22 and 23 respectively of the bearing 20. Upon completion of this operation, the operator may, through any suitable mechanism, cause the processing tool and fixture ram to return to normal position or this may be done automatically after the work piece treating operation has been completed.

If, on the other hand, dirt or some foreign particle or if due to an oversight holes 21 are not provided in the bearing, said dirt or particle or bumps 41 in the fixture will hold the bearing from close contact with the fixture wall and prevent its snug fit therein and thereby cause an air leak from ducts 29 and 39 in excess of the allowable limit and sufficient to reduce the air pressure so that the device 99 cannot be operated. Thus the switch is maintained open, the solenoid actuator deenergized and consequently the valve 88 closed, thereby rendering the machine inoperative as far as the processing cycle thereof is concerned. Operation of lever 84 to open valve 81 permits the work piece clamping cycle as aforedescribed to be completed, but in case of an improper seating or nesting of the work piece in the fixture, the processing cycle cannot be instituted for the reasons given. This then, prevents processing of a work piece which may be correct in all details up to this operation, but which would certainly be spoiled and wasted if this processing were completed under improper conditions such as improper alignment with the processing tool.

The present invention automatically prevents the spoilage of perfectly good work pieces and does not depend upon the judgment of the operator or the reading of warning gauges. If the work piece is not properly nested in the fixture, it is not properly aligned with the processing tool and the machine cannot be operated to start its processing cycle. After the operator actuates valve 81 and the clamping cycle is completed, the machine does not start its processing cycle, he knows the work piece is not seated properly and then returns the machine to normal condition. This permits removal of the work piece and the particle which prevents its seating or nesting properly in the fixture, after which it is replaced in the fixture for a second trial. If all foreign particles have been removed from the fixture 24 and on second trial the machine again does not complete its full cycle then the operator knows that particular work piece is faulty per se and rejects it.

Thus by the present invention, scrap is reduced to a minimum and time and material previously expended on the work piece is saved.

While the embodiment of the present invention as herein disclosed, constitutes a preferred form, it is to be understood that other forms might be adopted, all coming within the scope of the claims which follow.

What is claimed is as follows:

1. In a machine for processing a work piece, the combination with a processing tool for operating on said work piece; of a fixture in which the work piece is nested to hold it in proper position relatively to the processing tool; a duct in said fixture in communication with a source of fluid pressure, said duct being substantially closed by the work piece only when it is properly nested in the fixture; normally inactive means for operating the processing tool; control mechanism connected with said means for rendering said means active; and a fluid pressure actuated device connected to the said source of fluid pressure and to the control mechanism, said device being operative for rendering the processing tool operating means active only when the work piece is properly nested in the fixture.

2. In a machine for processing a work piece, the combination with a processing tool for operating on said work piece; of a fixture in which the work piece is nested to hold it in proper position relatively to the processing tool; a duct in said fixture in communication with a source of fluid pressure, said duct being substantially closed by the work piece only when it is properly nested in the fixture; normally inactive actuating means for the processing tool; control mechanism connected to said actuating means and operative for rendering said means active; means for actuating the control mechanism; and a fluid pressure actuated device connected to the last mentioned means and to the source of fluid pressure, said device being dependent upon the proper nesting of the work piece in the fixture for rendering the said last mentioned means effective.

3. In a machine for processing a work piece, the combination with a processing tool for operating on the work piece; of a fixture in which the work piece is nested and held in proper position relatively to the processing tool, said fixture having a plurality of ducts certain of which are open to atmosphere, others being adapted to be substantially closed to atmosphere when the work piece is properly nested in the fixture; hydraulic means for actuating the processing tool; a valve operative for rendering said hydraulic means active and inactive; an actuator for operating the valve to control the processing tool; a fluid pressure actuated means connected to the actuator for controlling it; and a source of fluid pressure connected to the fluid pressure actuated means and the said other ducts in the fixture, said fluid pressure operating the fluid pressure actuated means only when the work piece is properly nested in the fixture.

4. In a machine for processing a work piece, the combination with a processing tool for operating on the work piece; of a fixture in which the work piece is nested and held in proper position relatively to the processing tool, said fixture having grooves substantially closed to atmosphere by the work piece when it is properly nested in the fixture; power driven means for actuating the processing tool; control mechanism operative to apply the power to said means; means actuated by fluid pressure to operate the control mechanism; and a source of fluid pressure connected to both the fluid pressure actuated means and the grooves in the fixture, the fluid pressure operating the pressure actuated means when the work piece is properly nested in the fixture, and being reduced to a degree insufficient to operate said pressure actuated means when an improperly nested work piece permits a predetermined fluid pressure leak from the grooves in the fixture.

5. In a machine for processing a work piece, the combination with a processing tool for operating on the work piece; of a fixture in which the work piece is nested and held in proper position relatively to the processing tool, said fixture having grooves substantially closed to atmosphere by the work piece when it is properly nested in the fixture; an hydraulic ram for actuating the processing tool; a normally closed valve operative to direct hydraulic pressure to the ram for actuating it; a solenoid for operating the valve; a switch for controlling the solenoid; a pressure actuated device for closing the switch; a source of fluid pressure connected to the said device and to the grooves in the fixture, said fluid pressure being reduced below the required amount to operate the said device when the work piece is improperly nested in the fixture and permits a pressure leak from the grooves in said fixture; and a manually operated control for directing hydraulic pressure to the valve.

6. In a machine for processing a work piece, the combination with a processing tool for operating on the work piece; of a fixture in which the work piece is nested and held in proper position relatively to the processing tool, said fixture having grooves substantially closed to atmosphere by the work piece when it is properly nested in the fixture; an hydraulically actuated clamp for holding the work piece in the fixture; an hydraulic ram for actuating the processing tool; a normally closed valve operative to direct hydraulic pressure to the ram for actuating it; a manually operable valve for directing hydraulic pressure to the clamp; a valve renderd effective by complete operation of the clamp to direct the hydraulic pressure to the valve; an electric solenoid for actuating the valve to open it; a normally open switch connected in circuit with the solenoid; a pressure actuated device connected to the switch for closing it; and a source of fluid pressure connected to both the said device and the grooves in the fixture, said fluid pressure being sufficient to actuate the device only when proper seating of the work piece in the fixture substantially closed said grooves.

7. In a machine for processing a work piece, the combination with a processing tool for operating on said work piece; of a clamping fixture in which the work piece is nested to hold it in proper position relatively to the processing tool; a groove in said fixture, said groove being closed by the work piece when it is properly nested in the fixture; an actuating device operated by fluid pressure; a source of fluid pressure connected to both the groove in the fixture and the actuating device, said fluid pressure operating the actuating device only when the properly seated work piece closes the groove in the fixture; an actuator for the fixture to clamp the work piece therein; an actuator for the processing tool; a source of fluid pressure connected to both actuators; a valve normally closing the fluid pressure from the processing tool actuator; and means connected to the said actuating device and to the valve and operative by the actuating device to open the valve and render the actuator of the processing tool active.

8. In a machine for processing a work piece, the combination with a processing tool for operating on said work piece; of a fixture in which the work piece is nested and clamped to hold it in proper position relatively to the processing tool; a groove in said fixture, closed by the work piece when it is properly nested and clamped in the fixture; pressure actuated means for operating both the fixture and the processing tool; a fluid pressure supply; a manually operable member for connecting the pressure supply with the pressure actuated means to render them active; a valve normally closing the pressure supply from the processing tool actuating means; control mechanism connected to the valve; a pressure controlled actuator for said control mechanism; and a second pressure supply connected with the fixture groove and the pressure controlled actuator, said second pressure supply becoming effective to operate the actuator for moving the control mechanism to open the valve only when the groove in the fixture is closed.

BERNARD A. BROWN.
HOOPER J. HOUCK.

REFERENCES CITED

The following references are of record in the file of this patent:

UNITED STATES PATENTS

| Number | Name | Date |
|---|---|---|
| 1,835,591 | Bullard | Dec. 8, 1931 |
| 1,905,094 | Hirvonen | Apr. 25, 1933 |
| 1,939,038 | Bower et al. | Dec. 12, 1933 |